United States Patent [19]

Frihart et al.

[11] Patent Number: 4,515,939
[45] Date of Patent: May 7, 1985

[54] POLY(ESTER-AMIDE) HOT-MELT ADHESIVES

[75] Inventors: Charles R. Frihart, Lawrenceville; Richard L. Veazey, East Windsor Township, Mercer County both of N.J.

[73] Assignee: Union Camp Corporation, Wayne, N.J.

[21] Appl. No.: 499,336

[22] Filed: May 31, 1983

[51] Int. Cl.³ .............................................. C08G 69/26
[52] U.S. Cl. ................... 528/339.3; 528/289; 528/291; 528/295.3; 528/338; 528/339.5
[58] Field of Search .................. 528/339.3, 339.5, 338, 528/289, 291, 295.3

[56] References Cited

U.S. PATENT DOCUMENTS 3,377,303 4/1968 Peerman et al. ................. 528/339.3

Primary Examiner—Harold D. Anderson
Attorney, Agent, or Firm—Kane, Dalsimer, Kane, Sullivan and Kurucz

[57] ABSTRACT

There is disclosed a group of poly(ester-amide) compositions which possess unexpectedly good low temperature adhesive properties with respect to vinyl based substrates. These poly(ester-amide) compositions are the reaction product of a polymeric fatty acid, with an organic diamine, dicarboxylic acid and an alkanolamine having the general formula:

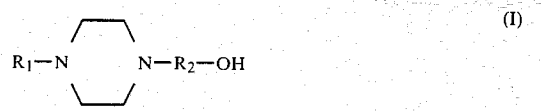

(I)

wherein $R_2$ represents alkylene of 2 to 8 carbons, and $R_1$ is selected from the group consisting of hydrogen and a monovalent moiety of the formula:

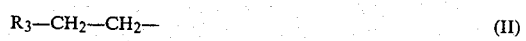

(II)

wherein $R_3$ is selected from hydroxyl and amino groups.

The term "alkylene of 2 to 8 carbons" as used throughout the specification and claims means a divalent moiety of the formula:

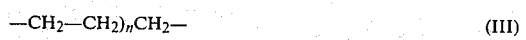

(III)

wherein n is an integer of from 0 to 6. N-(2-hydroxyethyl)piperazine is a preferred compound of the alkanolamine group.

18 Claims, 2 Drawing Figures

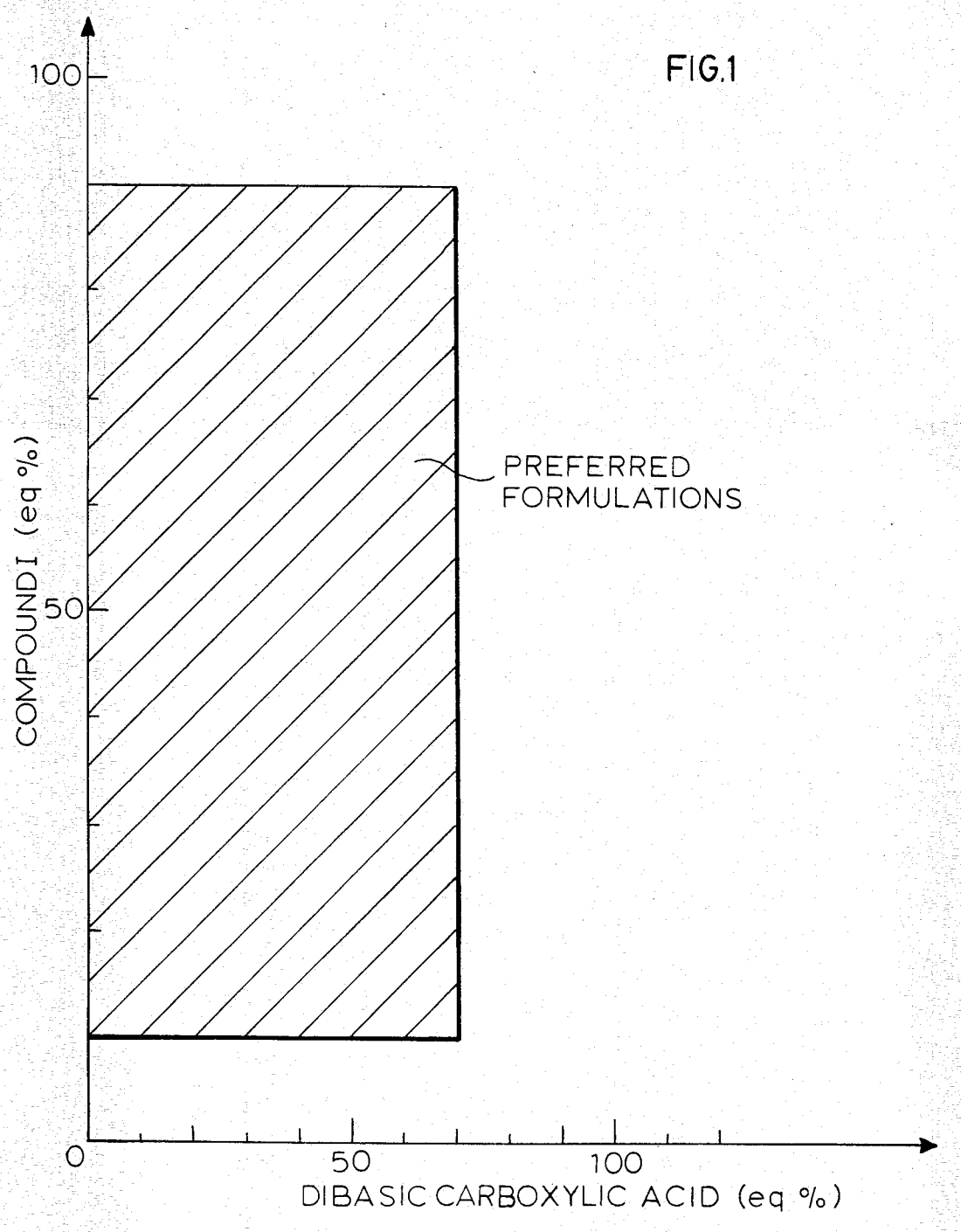

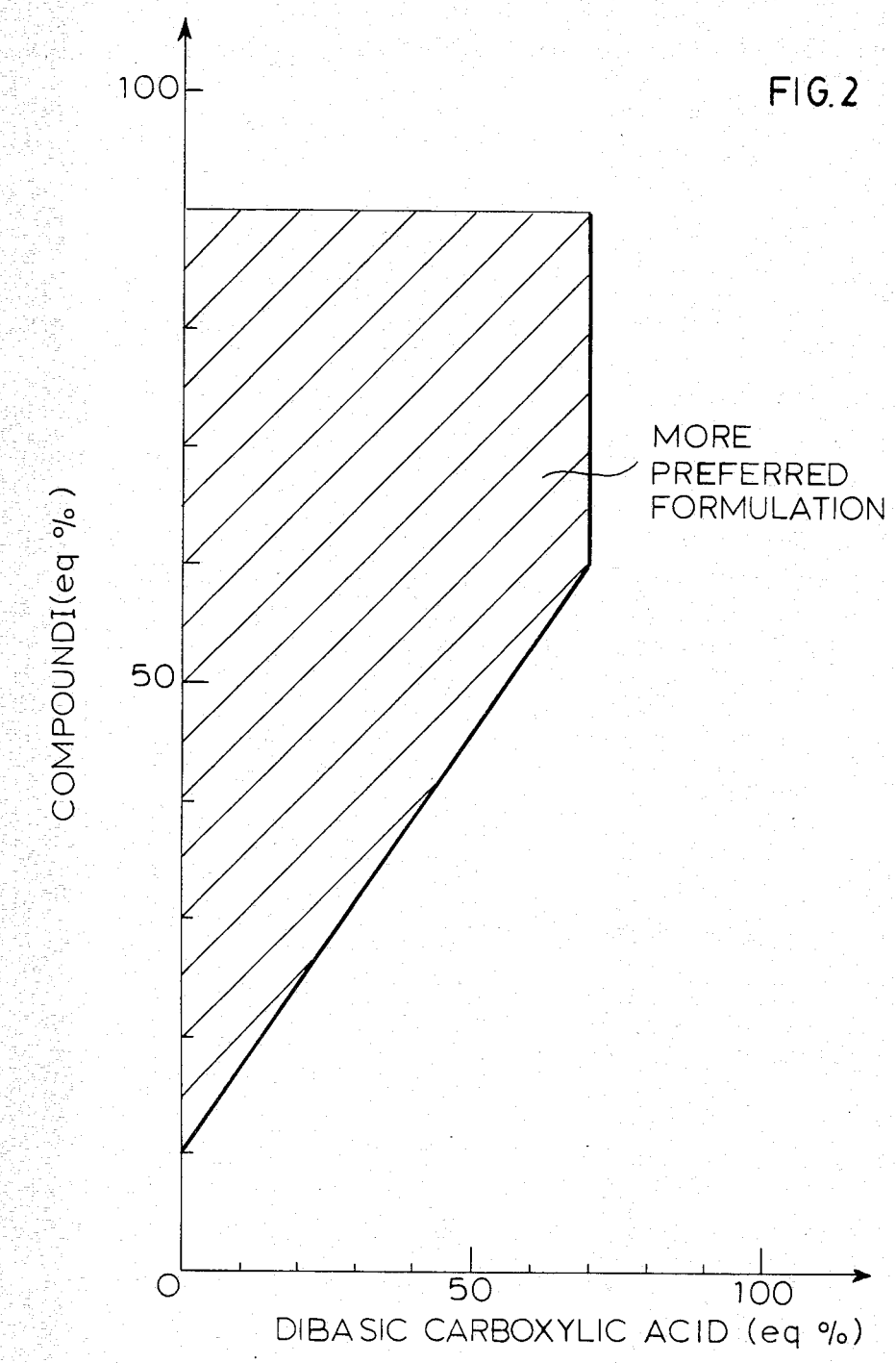

POLY(ESTER-AMIDE) HOT-MELT ADHESIVES

BACKGROUND OF THE INVENTION

1. Field of the Invention

The invention relates to poly(ester-amides) and more particularly relates to poly(ester-amide) hot-melt adhesive compositions.

2. Brief Description of the Prior Art

Poly(ester-amide) hot-melt adhesive compositions have been described in the prior art literature; see for example the descriptions given in the U.S. Pat. Nos. 3,484,339 and 3,377,303. These poly(ester-amides) are particularly useful for bonding polyvinyl chloride surfaces. We have now found that particular poly(ester-amides) formed by the condensation of substantially equivalent proportions of a mixture of polymeric fatty acids and dicarboxylic acids with a mixture of organic diamines and a particular alkanolamine exhibit superior adhesive properties, particularly at low temperatures, which are useful in the bonding of polyvinyl chloride films.

SUMMARY OF THE INVENTION

The invention comprises a poly(ester-amide) adhesive composition which comprises; the product of the polymerization of
(a) from 30 to 95 equivalent percent of a polymeric fatty acid; and
(b) from 5 to 70 equivalent percent of a dicarboxylic acid; with a substantially equivalent amount of
(c) from 10 to 95 equivalent percent of an organic diamine; and
(d) from 5 to 90 equivalent percent of an alkanolamine of the formula:

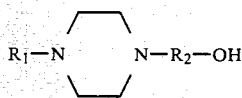  (I)

wherein $R_2$ represents alkylene of 2 to 8 carbons, and $R_1$ is selected from the group consisting of hydrogen and a monovalent moiety of the formula:

$$R_3-CH_2-CH_2- \quad (II)$$

wherein $R_3$ is selected from hydroxyl and amino groups.

The term "alkylene of 2 to 8 carbons" as used throughout the specification and claims means a divalent moiety of the formula:

$$-CH_2-CH_2)_{\overline{n}}CH_2- \quad (III)$$

wherein n is an integer of from 0 to 6. Representative of such alkylene are ethylene, propylene, butylene, pentylene, hexylene, heptylene, octylene and isomeric forms thereof.

The poly(ester-amide) compositions of the invention are useful adhesives, particularly for the bonding of polyvinyl chloride films, at low temperatures.

BRIEF DESCRIPTION OF THE DRAWINGS

FIG. 1 is a graphical representation of preferred formulations making up compositions of the invention.

FIG. 2 is a graphical representation of the most preferred formulations making up compositions of the invention.

DETAILED DESCRIPTION OF THE PREFERRED EMBODIMENTS OF THE INVENTION

The reactants employed to prepare the poly(ester-amide) compositions of the invention are all well known as are the methods of their preparation. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
|---|---|
| $C_{18}$ monobasic acids (monomer) | 0-5 |
| $C_{36}$ dibasic acids (dimer) | 60-95 |
| $C_{54}$ and higher polybasic acids (trimer) | 1-35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681.

A wide variety of dicarboxylic acids may be employed in the preparation of the compositions of the invention, including aliphatic, cycloaliphatic and aromatic dicarboxylic acids. Representative of such acids, which may contain from 2 to 20 carbon atoms, are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Methods of preparing these preferred acids are well known, and they are readily available commercially.

Preferred dicarboxylic acids employed in the invention are straight chain aliphatic diacids having at least 6 carbon atoms and more preferably 6 to 12 carbon atoms such as azelaic and sebacic acids which are most preferred. It should be understood that use of the corresponding acid anhydrides, esters, and acid chlorides of these acids is included in the term "dicarboxylic acid".

The organic diamines preferably employed in preparing the compositions of the present invention may be one or more of the known aliphatic, cycloaliphatic or aromatic diamines having from about 2 to 20 carbon atoms. Preferred especially are the alkylene diamines. Illustrative of the preferred diamines are ethylene diamine, 1,3-diaminopropane, 1,4-diaminobutane, terephthalyl diamine, known as p-xylene diamine, 1,6-hexamethylene diamine, 4,4'-methylenebis(cyclohexylamine), 2,2-di-(4-cyclohexylamine)propane, polyglycol diamines, isophorone diamine, isophthalyl diamine, known as m-xylene diamine, cyclohexanebis(methylamines), bis-1,4-(2'-aminoethyl)benzene and 4,4'-methylenebis(cyclohexylamine). These diamine compounds are all prepared by well known methods and many are commercially available. Preferred particularly are the straight chain aliphatic diamines of 2 to 20 carbon atoms, especially ethylene diamine, and cycloaliphatic diamines, especially 4,4'-methylenebis(cyclohexylamine).

The alkanolamine compounds of the formula (I) given above are also generally well known compounds as are the methods of their preparation. In general, they may be prepared by reacting an appropriate halogenated alcohol with piperazine to obtain the corresponding substituted piperazine.

Representative of the alkanolamines of the formula (I) are N-(2-hydroxyethyl)piperazine, N-(2-hydroxybutyl)piperazine, N-(2-hydroxyoctyl)piperazine, N-(2-hydroxyethyl)-N'-(2-hydroxypropyl)piperazine, N-(2-hydroxyethyl)-N'-(2-aminopropyl)piperazine and the like.

The technique and general method of polymerizing the mixed reactants is generally well known; see for example U.S. Pat. No. 3,484,339 and 3,377,303.

The poly(ester-amides) of the present invention may be prepared by charging a resin kettle with the reactants, in proportions as hereinafter described and heating the mixture to a temperature at which polymerization occurs. In general, heating of the reactants is to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid. The heating of the reaction mixture may be carried out until a selected viscosity of the reaction mixture is reached, e.g. 1,000–100,000 cps at 195° C. and preferably 7,500–20,000 cps at 195° C. In addition, small amounts (0.5 to 10 eq. %) of a saturated linear carboxylic acid containing 5–20 carbons may be added to the mixture to control molecular weight and viscosity—such acids include for example stearic and palmitic acid.

The relative quantities of the reactants are selected so that substantially equivalent numbers of reactive carboxyl and amine groups are present in the reaction mixture to produce a neutral or balanced poly(ester-amide), i.e., the acid and amine numbers are substantially equal. Slight excesses of carboxyl or amine are acceptable but this ratio is preferably maintained between 0.9:1 and 1:1.1 so that acid and amine numbers will be less than 35 preferably less than 20. Amine and acid numbers may be measured by conventional titrimetric analytical technique and are usually given as equivalents (or meqs.) of potassium hydroxide per gram of product.

The presence of a significant quantity of the compound of the formula (I) described above, will provide a composition of the invention exhibiting improved adhesive properties, for adhering vinyl films at low temperatures. Advantageously, the compound of the formula (I) will provide from 5 to 90 equivalent percent of the mixture of diamine and alkanolamine. The presence of from 10 to 95 equivalent percent of organic diamine provides important properties in the compositions of the invention.

Similarly, the inclusion of the dicarboxylic acid reactant, other than the polymerized fatty acid reactant, is important in order to raise the softening point in the product composition. In general, from 5 to 70 equivalent percent of the mixture of dicarboxylic acid and polymeric fatty acid should comprise the dicarboxylic acid, even though the use of the dicarboxylic acid tends to counter the effects of the compound of formula (I) (raising the softening point and the brittleness of the product composition).

Preferred proportions of the compound of formula (I), organic diamine, dicarboxylic acid, and polymeric fatty acid lie within the compositional boundaries defined in FIG. 1. The preferred formulations have less than 90 but greater than 10 eq. % of compound (I) and less than 70 eq. % of dicarboxylic acid. More preferred amounts of compound I, diamine, dicarboxylic acid, and polymeric fatty acid have been found to lie within the compositional boundaries shown in FIG. 2.

As examples of the compositions within the boundaries shown in FIG. 2 are those which would fall at each corner of the shaded area shown in FIG. 2. These four compositions are:

1. Composition contains 10 equivalent percent compound I or 90 equivalent percent organic diamine and 100 equivalent percent polymeric fatty acids.
2. Composition contains 60 equivalent percent compound I or 40 equivalent percent organic diamine and 70 equivalent percent dibasic carboxylic acid and 30 equivalent percent polymeric fatty acids.
3. Composition contains 90 equivalent percent compound I, 10 equivalent percent organic diamine and 70 equivalent percent dibasic carboxylic acid and 30 equivalent percent polymeric fatty acid.
4. Composition contains 90 equivalent percent compound I, 10 equivalent percent organic diamine and 100 equivalent percent polymeric fatty acid.

The following examples serve to illustrate the spirit and scope of the invention and set forth the best mode contemplated by the inventors but are not to be construed as limiting. Ball and ring softening points were determined by the test method described in ASTM test method 28-58T. T-Peel strengths were determined by ASTM test method D-1876-72 at 0° C. and at 20° C. The low temperature impact properties were determined by ASTM test method D-746-67T.

EXAMPLE 1

A polymer was prepared with the following reactants:

|  | Grams | Equivalents |
|---|---|---|
| polymeric fatty acid* | 261.10 | 0.92 |
| sebacic acid | 40.20 | 0.40 |
| ethylenediamine (EDA) | 12.30 | 0.41 |
| N—(2-hydroxyethyl) piperazine (HEP) | 62.80 | 0.97 |
| Stearic acid** | 5.60 | 0.02 |

*Dimer-14; Union Camp Corporation, Wayne, New Jersey; having the composition:
monomer 0.4 wt %
dimer 95.6 wt %
trimer (and higher polymer) 4.0 wt %
**Stearic acid referred to hereafter is a mixture of 52.4 eq. % stearic acid and 47.6 eq. % palmitic acid.

The reactants were all charged in a resin kettle with 6 drops of phosphoric acid catalyst and refluxed at a temperature of 138°–160° C. with stirring, under a blanket of nitrogen gas for 3 hours. The mixture was then heated gradually from reflux temperature to 235° C. while water was removed by distillation. The mixture was heated at temperatures of 200°–235° C. under a vacuum of 0.1–2.5 mm Hg for 3 hours. Then 1.5 g of Irganox 1010 (an antioxidant) was added to the mixture and stirred in for approximately 30 minutes. The polymer thus produced had a melt viscosity of 15,250 cps at 195° C. and a ball and ring softening point range of 110°–120° C. This polymer will be referred to as sample A.

EXAMPLE 2

The procedure of Example 1, supra, was repeated a plurality of times, except that in two cases HEP was replaced with piperazine (sometimes referred to as PIP) or N-aminoethyl piperazine (sometimes referred to as NAEP) and except that the sample was heated at 140°–170° C. for only 30 minutes prior to removing the water of reaction. These two polymers are referred to as samples B and C, respectively.

The compositions B and C are not compositions of the invention but were made for comparative purposes. All of the compositions A–C were tested for their adhesive and low temperature properties.

The compositions prepared, the reactants used, the equivalents employed, the tests conducted and the results are set forth below:

| COMPOSITION | REACTANTS | NORMALIZED[a] EQUIVALENTS |
|---|---|---|
| A | Dimer 14 | (0.69) |
|  | Sebacic acid | (0.30) |
|  | EDA | (0.31) |
|  | HEP | (0.72) |
|  | Stearic Acid[c] | (0.02) |
| B (Comparative) | Dimer-14 | (0.69) |
|  | Sebacic acid | (0.30) |
|  | EDA | (0.32) |
|  | Piperazine | (0.73) |
|  | Stearic Acid[c] | (0.02) |
| C (Comparative) | Dimer-14 | (0.69) |
|  | Sebacic acid | (0.30) |
|  | EDA | (0.30) |
|  | NAEP | (0.73) |
|  | Stearic Acid[c] | (0.02) |

| PHYSICAL PROPERTIES | | | | | | |
|---|---|---|---|---|---|---|
| | T-Peel in (#/in) | | | Percent Specimens Passing Impact Test Conducted At The Following Temperatures | | |
| Composition | 0° C. | Failure Mode | 22° C. | 10 | 0 | −10 | −20° C. |
| A | 37.6 | C,F | 19.8 | — | — | 100 | 0 |
| B | 7.3 | C,B | 21.9 | — | — | 0 | 0 |
| C | 8.7 | C,B | 20.4 | — | — | 80 | 0 |

[a]Compositions were normalized to 1 for the acid or amine equivalents employed in the least amounts for comparative reasons.
[b]Adhesive Failure Mode symbols:
A = Adhesive failure;
B = Brittle peel;
F = Flexible peel.
C = Cohesive failure
SB = Semi-Brittle peel;
[c]See Example 1.

EXAMPLE 3

A polymer was prepared with the following reactants:

|  | GRAMS | EQUIVALENTS |
|---|---|---|
| polymeric fatty acid* | 264.27 | 0.93 |
| sebacic acid | 40.71 | 0.40 |
| ethylenediamine (EDA) | 21.7 | 0.57 |
| N—(2-hydroxyethyl) piperazine (HEP) | 38.9 | 0.78 |

*See Example 1.

The reactants were charged in a resin kettle and refluxed at a temperature of 138°–160° C. with stirring, under a blanket of nitrogen gas for 3 hours. The mixture was then heated gradually from reflux temperature to 235° C. while water was removed by distillation. Approximately 0.5 ml of phosphoric acid catalyst was then added to the mixture and heated resumed at temperatures of 200°–235° C. under a vacuum of 2.0–3.0 mm Hg until samples taken from the mixture had a viscosity of 10,000 cps at 195° C. (approximately 4 hours). Then 1.5 g of Irganox 1010 (an antioxidant) was added to the mixture and stirred in for approximately 15 minutes. The polymer thus produced had a melt viscosity of 8600 cps at 195° C. and a ball and ring softening point range of 120°–135° C. This polymer is referred to as composition D.

EXAMPLE 4

The procedure in Example 2, supra, was repeated a plurality of times, except that the proportions of reactants were varied or the dicarboxylic acid was changed. Two polymer samples prepared in this manner with PIP and NAEP in place of HEP for comparative purposes are referred to as E and F and their compositions are set forth below.

The compositions prepared, the reactants used, the equivalents employed, and the tests conducted were as follows:

| COMPOSITION | REACTANTS | NORMALIZED[a] EQUIVALENTS |
|---|---|---|
| D | Dimer-14 | (0.70) |
|  | Sebacic acid | (0.30) |
|  | EDA | (0.43) |
|  | HEP | (0.59) |
| E (Comparative) | Dimer-14 | (0.71) |
|  | Sebacic acid | (0.31) |
|  | EDA | (0.42) |
|  | Piperazine | (0.58) |
|  | Stearic Acid[a] | (0.01) |
| F (Comparative) | Dimer-14 | (0.71) |
|  | Sebacic acid | (0.30) |
|  | EDA | (0.43) |
|  | NAEP | (0.58) |
|  | Stearic Acid[a] | (0.02) |

| PHYSICAL PROPERTIES | | | | | | | |
|---|---|---|---|---|---|---|---|
| | T-Peel in (#/in) | | Percent Passing Impact Test Conducted At The Following Temperatures | | | | |
| Composition | 0° C. | Failure Mode at 0° C. | 22° C. | 10 | 0 | −10 | −20° C. |
| D | 23.0 | SB | 16.6 | 100 | 100 | 40 | 0 |
| E | 3.1 | B | 17.7 | 20 | 0 | — | — |
| F | 1.6 | B | 24.4 | 100 | 100 | 60 | 0 |

[a]See footnotes in Examples 1 and 2, supra.

EXAMPLE 5

A polymer was prepared with the following reactants:

|  | GRAMS | EQUIVALENTS |
|---|---|---|
| polymeric fatty acid (Dimer-14) | 264.30 | 0.93 |
| sebacic acid | 40.71 | 0.40 |
| ethylenediamine (EDA) | 21.70 | 0.72 |
| N—(2-hydroxyethyl) piperazine (HEP) | 38.90 | 0.60 |

The above reactants were charged in a resin kettle and heated to 150° C. with stirring under a nitrogen gas atmosphere for 3 hours allowing the water of reaction and unreacted diamines to reflux. The water was then removed by distillation and the reaction mixture temperature rose to 220° C. Then 1.1 g of tin oxalate (FAS- CAT 2001), an esterification catalyst, was added to the reaction mixture and the reaction temperature maintained at 210° to 240° C. with a vacuum of 0.5-0.7 mm of Hg for 3.5 hours. Then approximately 1.5 g of Irganox 1010 (supra) was added and the mixture stirred for about 30 minutes. The polymer thus produced had a melt viscosity of 15,250 cps at 195° C. and a ball and ring softening point range of 146°-153° C. This composition is referred to as sample G. Sample H was prepared similarly.

EXAMPLE 6

The procedure of Example 1, supra, was repeated except that the roportion of reactants were as follows:

|  | GRAMS | EQUIVALENTS |
|---|---|---|
| polymeric fatty acid* | 255.1 | 0.90 |
| sebacic acid | 39.40 | 0.39 |
| ethylenediamine (EDA) | 12.20 | 0.72 |
| N—(2-hydroxyethyl) piperazine (HEP) | 61.7 | 0.60 |
| Stearic acid* | 5.6 | 0.02 |

*See Example 1.
This polymer is referred to as sample I.

EXAMPLE 7

The procedure of Example 6, supra, was repeated a plurality of times, except that the HEP was replaced with piperazine or N-aminoethylpiperazine for comparative purposes and except that the sample was heated at 140°-170° C. for only 30 minutes prior to removing the water of reaction. Two polymers formulated in the described manner as referred to as samples J and K, respectively.

The compositions prepared, the reactants charged, the equivalents employed, and the tests conducted were as follows for Examples 5, 6 and 7:

| COMPOSITION | REACTANTS | NORMALIZED[a] EQUIVALENTS |
|---|---|---|
| G | Dimer-14 | (0.71) |
|  | Sebacic acid | (0.30) |
|  | EDA | (0.55) |
|  | HEP | (0.46) |
| H | Dimer-14 | (0.71) |
|  | Sebacic acid | (0.31) |
|  | EDA | (0.55) |
|  | HEP | (0.45) |
|  | Stearic Acid[a] | (0.01) |
| I | Dimer-14 | (0.69) |
|  | Sebacic acid | (0.30) |
|  | EDA | (0.56) |
|  | HEP | (0.46) |
|  | Stearic Acid[a] | (0.01) |
| J (Comparative) | Dimer-14 | (0.70) |
|  | Sebacic acid | (0.30) |
|  | EDA | (0.57) |
|  | Piperazine | (0.47) |
| K (Comparative) | Dimer-14 | (0.70) |
|  | Sebacic acid | (0.30) |
|  | EDA | (0.58) |
|  | NAEP | (0.47) |

PHYSICAL PROPERTIES

| Composition | T-Peel in (#/in) 0° C. | Failure Mode[a] | 22° C. | Percent Pass Impact Test Conducted At The Following Temperatures | |
|---|---|---|---|---|---|
|  |  |  |  | +10° C. | 0° C. |
| G | 2.6 | C,SB | 17.3 | — | 0 |
| H | 1.3;3.5 | A/C | 14.2 | 20 | 0 |
| I | 4.8 | C,SB | 16.8 | — | — |
| J | .5 | A | 16.1 | — | 0 |
| K | — | — | 3.2 | — | 40 |

[a]See footnotes in Examples 1 and 2, supra.

EXAMPLE 8

The procedure of Example 5 was repeated twice except that the proportions of reactants were changed as shown below in polymer samples L and M.

EXAMPLE 9

The procedure in Example 5 was repeated twice except that the proportion of reactants were changed as shown below in polymer samples N and O.

The compositions prepared, the reactants charged, the equipment employed, and the tests conducted were as follows for the polymers of Examples 8 and 9:

| COMPOSITION | REACTANTS | NORMALIZED[a] EQUIVALENTS |
|---|---|---|
| L | Dimer-14 | (0.95) |
|  | Sebacic acid | (0.05) |
|  | EDA | (0.56) |
|  | HEP | (0.46) |
|  | Stearic Acid[a] | (0.01) |
| M | Dimer-14 | (0.53) |
|  | Sebacic acid | (0.49) |
|  | EDA | (0.37) |
|  | HEP | (0.63) |
| N | Dimer-14 | (0.87) |
|  | Sebacic acid | (0.12) |
|  | EDA | (0.38) |
|  | HEP | (0.64) |
|  | Stearic Acid[a] | (0.01) |
| O | Dimer-14 | (0.44) |
|  | Sebacic acid | (0.54) |
|  | EDA | (0.56) |
|  | HEP | (0.46) |
|  | Stearic Acid[a] | (0.03) |

PHYSICAL PROPERTIES

| COMP. | 0° C. T-PEEL #/IN | FAIL MODE* | 22° C. T-PEEL #/In | % PASS IMPACT TEST @ +10 | 0 | −10 | −20 | −30° C. |
|---|---|---|---|---|---|---|---|---|
| L | 4.5 | C,SB | 18.6 | — | — | 100 | 100 | 10 |
| M | 12.3 | C,B | 19.4;14.8 | — | — | — | — | — |

| -continued | | | | | | | | |
|---|---|---|---|---|---|---|---|---|
| N | 28.7 | C,F | 19.8 | — | — | 100 | 0 | — |
| O | 0.5 | A | 0 | — | — | — | — | — |

[a] See footnotes of Examples 1 and 2, supra.

As can be seen from the above examples, the mode of failure data for compositions of the present invention A, D, M and N indicates that these materials remain flexible or partially flexible at 0° C. in contrast to the PIP and NAEP based compositions suggesting that comparable or better T-peel strengths occur at lower temperatures than 0° C. Comparisons of the HEP, PIP and NAEP compositions are more clearly demonstrated in the examples. Of the three different compositions, the HEP copolymers show higher 0° C. T-peel strengths than the comparable compositions in which piperazine or N-aminoethylpiperazine were substituted for HEP.

The impact test data indicates that the poly(ester-amide) compositions of the present invention have impact properties comparable to the NAEP but better than the PIP compositions, i.e.; more of the samples pass the impact test at a given temperature.

In summary, the data presented indicates that poly(ester-amide) compositions prepared in accordance with the present invention possess impact and room temperature adhesive properties comparable to and, in some cases, better than analogous PIP and NAEP based compositions while exhibiting unexpectedly good low temperature adhesion to vinyl substrates.

What is claimed:

1. A poly(ester-amide) adhesive composition which comprises; the polymeric product of the polymerization of
   (a) from 30 to 95 equivalent percent of a polymeric fatty acid; and
   (b) from 5 to 70 equivalent percent of a dicarboxylic acid; and with a substantially equivalent amount of
   (c) from 10 to 95 equivalent percent of an organic diamine; and
   (d) from 5 to 90 equivalent percent of an alkanolamine of the formula:

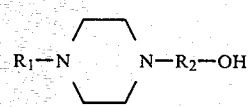

(I)

wherein $R_2$ represents alkylene of 2 to 8 carbons, and $R_1$ is hydrogen.

2. The composition of claim 1 wherein the dicarboxylic acid is a straight chain aliphatic diacid having at least 6 carbon atoms.

3. The composition of claim 2 wherein the diacid has from 6 to 12 carbon atoms.

4. The composition of claim 3 wherein the diacid is selected from the group consisting of azelaic and sebacic acids.

5. The composition of claim 1 wherein the organic diamine is a straight chain aliphatic diamine.

6. The composition of claim 5 wherein the diamine is ethylene diamine.

7. The composition of claim 1 wherein the alkanolamine is N-(2-hydroxyethyl)piperazine.

8. The composition of claim 1 wherein the organic diamine is a cycloaliphatic diamine.

9. The composition of claim 8 wherein the diamine is 4,4'-methylenebis(cyclohexylamine).

10. A poly(ester-amide) adhesive composition which comprises; the polymeric product of the polymerization of
    (a) from 30 to 95 equivalent percent of a polymeric fatty acid; and
    (b) from 5 to 70 equivalent percent of a dicarboxylic acid; and with a substantially equivalent amount of
    (c) from 10 to 95 equivalent percent of an organic diamine; and
    (d) from 5 to 90 equivalent percent of an alkanolamine of the formula:

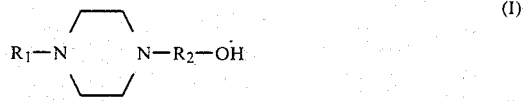

(I)

wherein $R_2$ represents alkylene of 2 to 8 carbons, and $R_1$ is hydrogen.

11. The composition of claim 10 wherein the dicarboxylic acid is a straight chain aliphatic diacid having at least 6 carbon atoms.

12. The composition of claim 11 wherein the diacid has from 6 to 12 carbon atoms.

13. The composition of claim 12 wherein the diacid is selected from the group consisting of azelaic and sebacic acids.

14. The composition of claim 10 wherein the organic diamine is a straight chain aliphatic diamine.

15. The composition of claim 14 wherein the diamine is ethylene diamine.

16. The composition of claim 10 wherein the alkanolamine is N-(2-hydroxyethyl)piperazine.

17. The composition of claim 10 wherein the organic diamine is a cycloaliphatic diamine.

18. The composition of claim 17 wherein the diamine is 4,4'-methylenebis(cyclohexylamine).

* * * * *